United States Patent
Oljaca et al.

(10) Patent No.: US 7,098,617 B1
(45) Date of Patent: Aug. 29, 2006

(54) ADVANCED PROGRAMMABLE CLOSED LOOP FAN CONTROL METHOD

(75) Inventors: Miroslav Oljaca, Tucson, AZ (US); Jeffrey David Johnson, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/059,250

(22) Filed: Feb. 16, 2005

(51) Int. Cl.
*H02P 1/00* (2006.01)
*G06F 15/18* (2006.01)

(52) U.S. Cl. ............. 318/268; 318/600; 318/811; 318/599; 706/52; 417/14

(58) Field of Classification Search ........ 318/260–268, 318/254, 471, 599, 600, 811; 388/806, 804; 361/697, 687; 710/100, 200; 700/108, 300; 706/52; 417/14
See application file for complete search history.

(56) References Cited

U.S. PATENT DOCUMENTS

| | | | | |
|---|---|---|---|---|
| 4,806,832 A * | 2/1989 | Muller | ............... | 388/833 |
| 5,153,822 A * | 10/1992 | Yubazaki et al. | ........ | 700/11 |
| 5,197,858 A * | 3/1993 | Cheng | ............... | 417/14 |
| 5,233,682 A * | 8/1993 | Abe et al. | ............ | 706/52 |
| 5,272,428 A * | 12/1993 | Spiegel et al. | ...... | 318/803 |
| 5,427,313 A * | 6/1995 | Davis et al. | ......... | 236/49.3 |
| 5,549,152 A * | 8/1996 | Davis et al. | ......... | 165/201 |
| 5,726,874 A * | 3/1998 | Liang | ............. | 363/141 |
| 5,727,928 A * | 3/1998 | Brown | ............ | 417/44.11 |
| 5,748,853 A * | 5/1998 | Deschenes | ........... | 706/3 |
| 5,825,642 A * | 10/1998 | Ishii et al. | ............ | 363/141 |
| 5,845,045 A * | 12/1998 | Jeske et al. | ............ | 388/804 |
| 5,910,158 A * | 6/1999 | Park | .............. | 62/148 |
| 5,921,099 A * | 7/1999 | Lee | ............... | 62/228.4 |
| 5,937,940 A * | 8/1999 | Davis et al. | ........... | 165/202 |
| 6,188,189 B1 * | 2/2001 | Blake | .............. | 318/471 |
| 6,191,546 B1 * | 2/2001 | Bausch et al. | ......... | 318/471 |
| 6,390,379 B1 * | 5/2002 | Huang | ............. | 236/49.3 |
| 6,392,372 B1 * | 5/2002 | Mays, II | ............ | 318/254 |
| 6,545,438 B1 * | 4/2003 | Mays, II | ............ | 318/254 |
| 6,601,168 B1 * | 7/2003 | Stancil et al. | .......... | 713/100 |
| 6,637,934 B1 * | 10/2003 | Henderson et al. | ...... | 374/178 |
| 6,650,074 B1 * | 11/2003 | Vyssotski et al. | ........ | 318/254 |
| 6,671,459 B1 * | 12/2003 | Bultman | ............ | 388/804 |
| 6,873,883 B1 * | 3/2005 | Ziarnik | ............ | 700/300 |
| 6,901,303 B1 * | 5/2005 | Larson et al. | ......... | 700/108 |
| 6,935,130 B1 * | 8/2005 | Cheng et al. | .......... | 62/259.2 |
| 2002/0060889 A1 * | 5/2002 | Teutsch et al. | .......... | 361/23 |
| 2003/0011332 A1 * | 1/2003 | Mays | ............. | 318/254 |
| 2003/0037193 A1 * | 2/2003 | Larson et al. | ......... | 710/200 |
| 2003/0120394 A1 * | 6/2003 | Ziarnik | ............ | 700/300 |
| 2003/0137267 A1 * | 7/2003 | Blake | .............. | 318/471 |

(Continued)

*Primary Examiner*—Paul Ip
(74) *Attorney, Agent, or Firm*—W. James Brady, III; Frederick J. Telecky, Jr.

(57) ABSTRACT

A fan control system and method that maintains the operating temperature of computer and electronic devices or components at about a predetermined control level to minimize power consumption and audible noise. The fan control system is a programmable closed loop system including a temperature sensor, first and second fan controllers, and a fan/motor assembly including a power converter, a motor, and a fan. The first fan controller provides programmable acceleration/deceleration of the fan during an initial fan spin up, and the second fan controller runs the fan only as fast as necessary to keep the sensed temperature level of a computer device as close as possible to the predetermined control level, thereby minimizing the power consumption of the system and the audible noise of the fan.

18 Claims, 3 Drawing Sheets

U.S. PATENT DOCUMENTS

| | | | |
|---|---|---|---|
| 2004/0009074 A1* | 1/2004 | Dodson, III | 417/22 |
| 2004/0040318 A1* | 3/2004 | Getz et al. | 62/132 |
| 2004/0264125 A1* | 12/2004 | Cheng et al. | 361/687 |
| 2004/0267990 A1* | 12/2004 | Lin | 710/100 |
| 2005/0030171 A1* | 2/2005 | Liu et al. | 340/500 |
| 2005/0047762 A1* | 3/2005 | Liu et al. | 388/806 |
| 2005/0052196 A1* | 3/2005 | Borkar | 324/760 |
| 2005/0146850 A1* | 7/2005 | Meir | 361/687 |
| 2005/0156544 A1* | 7/2005 | Marando et al. | 318/268 |
| 2005/0174737 A1* | 8/2005 | Meir | 361/697 |

* cited by examiner

ADVANCED PROGRAMMABLE CLOSED LOOP FAN CONTROL METHOD

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to systems and methods of controlling a fan to cool computer and electronic devices, components, and/or equipment enclosures, and more specifically to a system and method of controlling a cooling fan based on the sensed die temperature of a CPU. The presently disclosed system and method provide for reduced system power consumption and reduced audible fan noise.

In recent years, operating speeds of computer devices such as central processing units (CPUs) and microprocessors have undergone dramatic increases. Because increases in computer device speeds are typically accompanied by significant increases in the level of current flowing through the devices, the amount of heat dissipated by such computer devices has also risen dramatically. For this reason, there is a need for improved systems and methods of cooling computer devices and other electronic devices and/or components associated therewith to remove any excess heat that may cause high-speed computer systems to fail prematurely.

A conventional fan control system for cooling computer and electronic devices is disclosed in U.S. Pat. No. 6,188,189 (the '189 patent). As described in the '189 patent, a fan control system includes one or more temperature sensors such as thermal diode temperature sensors, and a pulse width modulation (PWM) control circuit operative to control the speed of a DC fan by varying the width of a PWM pulse. For example, a thermal diode temperature sensor may be implemented on an integrated circuit (IC) die of a CPU. In the event the sensed temperature of the CPU exceeds a predetermined maximum temperature Tmax, the PWM control circuit increases the PWM pulse width to increase the fan speed to its maximum level. In the event the sensed CPU temperature is less than a predetermined minimum temperature Tmin, fan cooling of the CPU device is deemed unnecessary, and the PWM control circuit therefore reduces the PWM pulse width to decrease the fan speed to zero. When the sensed CPU temperature falls within the range Tmin to Tmax, the PWM control circuit varies the PWM pulse width and consequently the fan speed linearly, i.e., the variation of the fan speed is linearly proportional to the sensed device temperature. The '189 patent further describes a power-up sequence for the fan control system, which includes spinning up the fan directly to its maximum speed for a limited time period upon power-up, before controlling the fan speed based on the sensed CPU temperature.

However, the conventional fan speed control system disclosed in the '189 patent has several drawbacks. For example, as described above, when the sensed CPU temperature is within the temperature range Tmin to Tmax, the system controls the fan speed so that it varies linearly over the range Tmin to Tmax. Although such linear control of the fan speed may maintain the CPU temperature within acceptable limits, it is generally ineffective at minimizing power consumption because the system including the fan control circuit and the computer device being cooled is typically dynamically nonlinear. Moreover, variations in power supply voltages, the ambient temperature, and the power dissipation of the CPU may contribute to the dynamic nonlinearity of the overall system. Accordingly, varying the fan speed linearly within the temperature range Tmin to Tmax may result in a fan speed and/or acceleration that is higher than necessary to cool the computer system, thereby causing increased system power consumption and increased audible fan noise. In addition, spinning up the fan directly to maximum speed during the fan power-up sequence may increase both the power consumption of the system and the audible noise of the fan.

Another conventional fan speed control system is disclosed in U.S. Pat. No. 6,601,168 (the '168 patent). As described in the '168 patent, a fan speed control system includes a temperature sensor operative to sense the temperature of an IC chip, and a fan controller operative to adjust the speed of a cooling fan to a target speed based on the sensed IC temperature. Specifically, the fan controller slowly adjusts the fan speed from an initial speed toward the target speed such that the audible noise associated with accelerating (or decelerating) the fan is reduced and therefore made less perceptible to the user of the computer system. However, although the fan speed control system of the '168 patent may reduce the audible fan noise, it may be incapable of minimizing the power consumption of the overall system.

It would therefore be desirable to have an improved fan control system and method for use in high-speed computer systems. Such an improved fan control system and method would be capable of maintaining the temperature of computer and electronic devices, components, and/or equipment enclosures at an optimal level for minimizing both the system power consumption and the audible fan noise.

BRIEF SUMMARY OF THE INVENTION

In accordance with the present invention, a fan control system and method is provided that maintains the operating temperature of computer and electronic devices or components at approximately a predetermined control level, thereby minimizing both the power consumption of the system and the audible noise of the fan.

In one embodiment, the fan control system is a programmable closed loop system that comprises one or more temperature sensors, first and second fan controllers, and a fan/motor assembly including a power converter, a motor, and a fan. Both the first fan controller and the second fan controller are connectable to the fan/motor assembly. The first fan controller is operative to control the speed of the fan during the initial fan spin up, and the second fan controller is operative to maintain the temperature of a computer device at approximately the predetermined control level after the initial fan spin up is completed.

In the presently disclosed embodiment, the first and second fan controllers comprise respective programmable pulse width modulation (PWM) controllers, and the fan/motor assembly includes a DC motor and fan. The first and second PWM controllers are operative to control the fan speed based on the variable width of a PWM pulse. In the event the temperature of the computer device sensed by the temperature sensor rises to meet or exceed the predetermined control level, the first PWM controller is connected to the fan/motor assembly and enabled, thereby initiating the spin up of the fan.

In the preferred embodiment, the spin up of the fan is performed in four stages. In a first stage, the first PWM controller provides PWM pulses to the fan/motor assembly that have a width corresponding to the minimum start-up voltage of the fan, as specified by the fan manufacturer. In a second stage, the first PWM controller provides PWM pulses that have increasing widths for gradually increasing the fan speed from a minimum level to its maximum level. In a third stage, the first PWM controller provides PWM pulses having a width sufficient to maintain the fan speed at its maximum level for a predetermined time period. In a fourth stage, the first PWM controller provides PWM pulses that have decreasing widths for gradually decreasing the fan speed from its maximum level to a user-defined programmable intermediate level between the minimum and maximum levels. During the second and fourth stages of the fan spin up, the fan control system provides programmable acceleration and deceleration, respectively, of the fan. Further, at the end of the fourth stage, i.e., after the initial fan spin up is completed, the first PWM controller is disconnected from the fan/motor assembly, and the second PWM controller is connected to the fan/motor assembly for controlling the fan speed to maintain the sensed temperature of the computer device at approximately the predetermined control level.

In the preferred embodiment, the temperature sensor is an on-die thermal diode temperature sensor configured to provide a representation of the local die temperature of the computer device. Further, the fan control system is configured to provide die temperature feedback from the thermal diode temperature sensor to the second PWM controller. The fan control system is operative to compare the sensed die temperature to the predetermined control level to generate an error signal, which has a magnitude corresponding to the difference between the sensed die temperature and the predetermined control level. The fan control system controls the fan speed based on the magnitude of the error signal. The second PWM controller is configured to accept the error signal as input, and to provide PWM pulses having variable widths based on the error magnitude. The second PWM controller provides the variable width PWM pulses to control the fan speed to levels sufficient to maintain the sensed temperature of the computer device at approximately the predetermined control level.

In the presently disclosed embodiment, if the sensed die temperature ($T_{diode}$) is greater than a predetermined minimum level ($T_{min}$) and $T_{diode}$ is less than or equal to the predetermined control level ($T_{control}$), i.e., the error magnitude is less than or equal to zero, then the second PWM controller provides PWM pulses having variable widths for controllably decreasing the fan speed, thereby allowing the level of $T_{diode}$ to increase such that it gradually approaches the level of $T_{control}$. If $T_{diode}$ rises to a level greater than $T_{control}$, i.e., the error magnitude is greater than zero, then the second PWM controller provides PWM pulses having variable widths for controllably increasing the fan speed, thereby causing the level of $T_{diode}$ to decrease such that it again gradually approaches the level of $T_{control}$. If $T_{diode}$ falls to a level less than $T_{min}$, then the fan control system is deactivated. If $T_{diode}$ subsequently rises to a level greater than $T_{min}$ and greater than or equal to $T_{control}$, i.e., the error magnitude is greater than or equal to zero, then the first PWM controller is operative to initiate the spin up of the fan, after which the second PWM controller is operative to control the fan speed based on the error magnitude to move $T_{diode}$ as close as possible to $T_{control}$.

By providing a programmable closed loop fan control system that allows programmable acceleration and deceleration of a fan upon power-up, and then runs the fan only as fast as necessary to keep the sensed temperature level of a computer device as close as possible to a predetermined control level, both the power consumption of the system and the audible noise of the fan can be reduced.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A fan control system and method is disclosed that provides controllable acceleration and deceleration of a fan during an initial fan spin up, and then runs the fan at speeds sufficient to maintain the operating temperature of a computer or electronic device or component at approximately a predetermined control level, thereby minimizing the power consumption of the system and the audible noise of the fan. The fan control system provides programmable closed loop control of the speed and acceleration of the fan based on the sensed temperature of the device or component.

Figure 1:
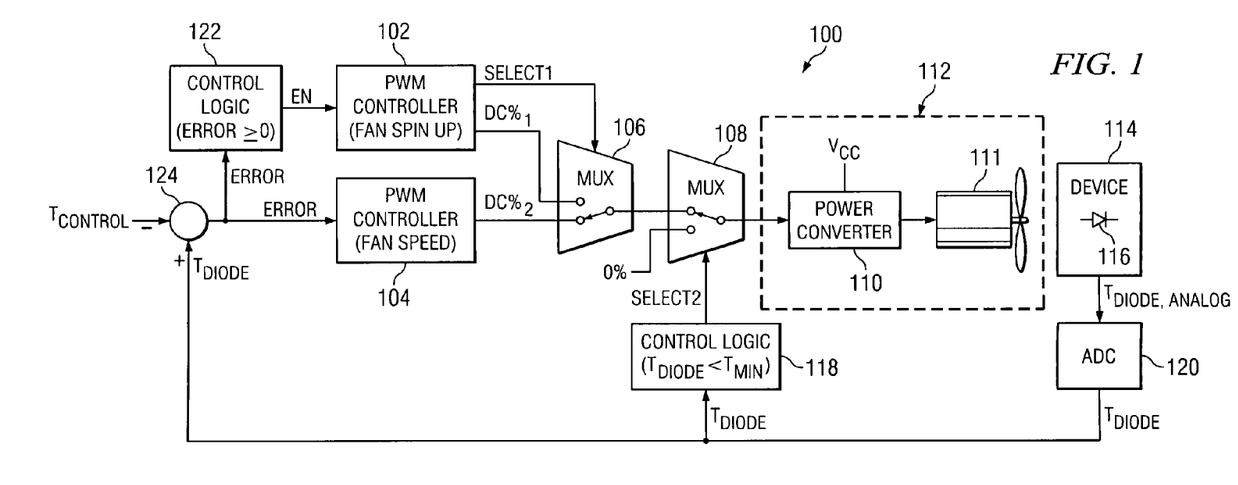
FIG. 1 is a block diagram of a fan control system according to the present invention.

FIG. 1 depicts an illustrative embodiment of a fan control system 100, in accordance with the present invention. In the illustrated embodiment, the fan control system 100 comprises a first fan controller 102, a second fan controller 104, control logic 118 and 122, a pair of multiplexors (MUXs) 106 and 108, a fan/motor assembly 112 including a power converter 110 and a motor and fan 111, a temperature sensor 116, an analog-to-digital converter (ADC) 120, and a summer 124. The first fan controller 102 is operative to control the speed and acceleration of the fan 111 during an initial spin up of the fan, and the second fan controller 104 is operative to control the fan speed and acceleration to maintain the sensed temperature of a computer device 114 at approximately a predetermined control level after the initial fan spin up is completed.

For example, the computer device 114 may comprise a microprocessor or a Central Processing Unit (CPU) within a computer system such as a desktop or laptop personal computer (PC; not shown). It is understood, however, that the computer device 114 may alternatively comprise one or more processors and/or other electronic devices or components associated therewith within a computer system. In the preferred embodiment, the fan control system 100 is implemented on one or more printed circuit boards (PCBs) within a PC.

In the presently disclosed embodiment, the fan/motor assembly 112 comprises a DC motor and fan 111, and the first and second fan controllers 102 and 104 comprise respective programmable pulse width modulation (PWM) controllers operative to control the speed of the fan 111 via PWM pulses having variable widths. Those of ordinary skill in this art will appreciate that there is a substantially linear relationship between the duty cycle of PWM pulses provided by a PWM controller and the speed of a DC fan. In one embodiment, the PWM controllers 102 and 104 are operative to provide PWM pulses having duty cycles ranging from about 50% to 100%, in which the 50% PWM duty cycle corresponds to the minimum fan voltage required to start the fan 111, and the 100% PWM duty cycle corresponds to the fan voltage required to run the fan 111 at maximum speed. It should be understood, however, that the minimum fan voltage required to start a fan is normally specified by the fan manufacturer, and that the 50% PWM duty cycle corresponding to the minimum fan voltage, as described herein, is merely provided for purposes of illustration. Accordingly, it is appreciated that any other suitable PWM duty cycles may be provided by the PWM controllers 102 and 104 for starting and for subsequently controlling the speed and acceleration of the fan 111, in accordance with fan spin up and temperature control procedures described herein.

In the illustrated embodiment, the computer device 114 comprises an integrated ciruict (IC) chip, and the temperature sensor 116 is a thermal diode temperature sensor implemented on the die of the IC chip. The temperature sensor 116 is configured to provide an analog representation of the local die temperature ($T_{diode,analog}$) of the computer device 114 to the ADC 120, which converts the analog temperature representation to digital form ($T_{diode}$). As shown in FIG. 1, the ADC 120 provides the sensed die temperature $T_{diode}$ to the control logic 118 and to the summer 124. It is understood that, in alternative embodiments, the function of converting the analog representation of the local die temperature of the computer device 114 may be provided within the device itself, thereby rendering the ADC 120 unnecessary.

The fan control system 100 maintains the operating temperature of the computer device 114 at about the predetermined control level by providing programmable closed loop control of the speed and acceleration of the fan 111 based on the sensed temperature $T_{diode}$ of the computer device 114. In an illustrative mode of operation, the PWM controllers 102 and 104 are initially disconnected from the fan/motor assembly 112, thereby causing the fan 111 to be placed in an "off" condition. Specifically, the control logic 118 provides a Select2 signal to the MUX 108, in which the Select2 signal initially has a logical level that causes the MUX 108 to select its second input "2", effectively providing a 0% PWM duty cycle to the power converter 110. It is noted that the PWM controller 102 initially provides a Select1 signal to the MUX 106, in which the Select1 signal has a logical level that causes the MUX 106 to select its first input "1".

More specifically, the control logic 118 receives the sensed temperature $T_{diode}$ from the ADC 120, and compares the temperature $T_{diode}$ to a predetermined minimum level $T_{min}$. In the event $T_{diode}$ is less than $T_{min}$, the control logic 118 provides the Select2 signal to the MUX 108, causing the MUX 108 to select its second input "2" and to provide the 0% PWM duty cycle to the power converter 110. In effect, the PWM controllers 102 and 104 are disconnected from the fan/motor assembly 112, and the fan 111 is "off". In the event $T_{diode}$ is greater than or equal to $T_{min}$, the control logic 118 provides the Select2 signal having a logical level that causes the MUX 108 to select its first input "1", in preparation of placing the fan 111 in an "on" condition. Because, as described above, the MUX 106 is also selecting its first input "1", the MUXs 106 and 108 form an electrical connection from the PWM controller 102 to the power converter 110.

As shown in FIG. 1, the summer 124 receives the sensed temperature $T_{diode}$ from the ADC 120, and determines the difference between the temperature $T_{diode}$ and a predetermined control level $T_{control}$, which is greater than the predetermined minimum level $T_{min}$. In the preferred embodiment, the predetermined control level $T_{control}$ corresponds to an optimal operating temperature of the computer device 114, as recommended by the device manufacturer. In the event $T_{diode}$ is greater than $T_{control}$, the summer 124 generates an error signal having a magnitude that is greater than zero, and provides the error signal to the control logic 122 and to the PWM controller 104, which at this time is disconnected from the fan/motor assembly 112. The control logic 122 receives the error signal, and compares the magnitude of the error signal to zero. Because the error magnitude is greater than zero, the control logic 122 provides an enable (en) signal to the PWM controller 102, thereby causing the PWM controller 102 to start performing the fan spin up procedure in response to the enable signal. For example, the PWM controller 102 may be configured to trigger on an edge of the enable signal.

Figure 2:
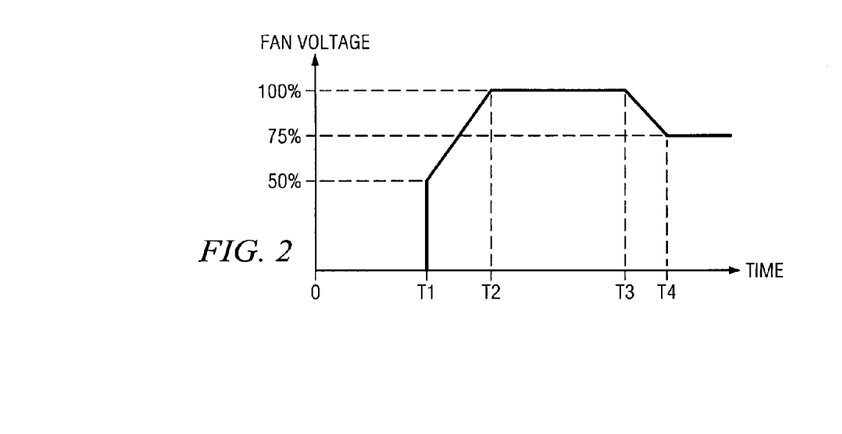
FIG. 2 is a diagram of fan voltage versus time corresponding to a fan spin up procedure performed by the fan control system of FIG. 1.

FIG. 2 depicts a diagram illustrating the voltage of the fan 111 versus time. The diagram of the fan voltage versus time corresponds to the fan spin up procedure, as performed by the PWM controller 102 (see FIG. 1). In the preferred embodiment, the fan spin up procedure comprises four stages, i.e., a first stage occurring at time T1, a second stage occurring from time T1 to time T2, a third stage occurring from time T2 to time T3, and a fourth stage occurring from time T3 to time T4.

At time T1, the PWM controller 102 provides about a 50% PWM duty cycle (DC %$_1$) to the power converter 110. As described above, when the PWM controller 102 is enabled to perform the fan spin up procedure, the MUXs 106 and 108 are controlled to select their first inputs "1", thereby forming an electrical connection from the PWM controller 102 to the power converter 110. In the presently disclosed embodiment, the 50% PWM duty cycle corresponds to the minimum fan voltage required to start the fan 111. It is understood that the PWM controller 102 may alternatively provide any suitable PWM duty cycle sufficient to start the fan 111, as recommended by the fan manufacturer. The power converter 110 receives the 50% PWM duty cycle, and converts the 50% PWM duty cycle to electrical energy, which is subsequently applied across the phase windings (not shown) of the DC motor to start the fan 111. When the fan 111 starts, the fan runs at its minimum speed.

From time T1 to time T2, the PWM controller 102 provides PWM duty cycles (DC %$_1$) ranging from about 50% to 100% to the power converter 110. As described above, the 100% PWM duty cycle corresponds to the fan voltage required to run the fan 111 at maximum speed. As shown in FIG. 2, the PWM duty cycle (fan voltage) ramps up over the time period T1 to T2, thereby gradually increasing the fan speed from the minimum speed to the maximum speed. In effect, the PWM controller 102 provides for a PWM soft start of the fan motor, thereby reducing the initial electrical current surge to the motor. In the preferred embodiment, the acceleration of the fan 111 from time T1 to time T2 can be programmed to minimize the system power consumption and the audible noise generated while the fan accelerates.

From time T2 to time T3, the PWM controller 102 provides the 100% PWM duty cycles (DC %$_1$) to maintain the fan speed at its maximum level. Providing 100% PWM duty cycles to the fan 111 for a predetermined time period is particularly useful in the event the recommended minimum fan voltage (e.g., corresponding to the 50% PWM duty cycle) fails to start the fan 111.

From time T3 to time T4, the PWM controller 102 provides PWM duty cycles (DC %$_1$) ranging from about 100% to 75% to the power converter 110. As shown in FIG. 2, the PWM duty cycle (fan voltage) ramps down over the time period T3 to T4, thereby gradually decreasing the fan speed from the maximum speed (e.g., corresponding to the 100% PWM duty cycle) to a user defined intermediate level (e.g., an intermediate level corresponding to the 75% PWM duty cycle) between the minimum speed (e.g., corresponding to the 50% PWM duty cycle) and the maximum speed. In the preferred embodiment, the deceleration of the fan 111 from time T3 to time T4 can be programmed to minimize the system power consumption and the audible noise generated while the fan decelerates.

At time T4, the PWM controller 102 provides the Select1 signal having a logical level that causes the MUX 106 to select its second input "2", thereby disconnecting the PWM controller 102 from the fan/motor assembly 112 and completing the fan spin up procedure.

Accordingly, the presently disclosed fan spin up procedure provides for a PWM soft start of the fan motor. Such a PWM soft start significantly reduces the average current requirements of the motor, and maintains good control of the fan acceleration. As described above, the ramp time during the second stage, i.e., soft start portion, of the fan spin up procedure can be varied to obtain a higher or lower acceleration of the fan 111. Similarly, the ramp time during the fourth stage of the fan spin up procedure can be varied to obtain different levels of fan deceleration. Because the fan spin up procedure provides for soft starting the fan motor, the speed of the fan can be increased to its maximum level with reduced mechanical stress, thereby increasing the lifetime of the motor and fan 111. Further, in the event a mechanical problem prevents the fan 111 from starting during the PWM soft start of the motor, the fan may be started during the third stage of the fan spin up procedure when the full fan voltage is applied and maximum motor torque is achieved.

Figure 3:
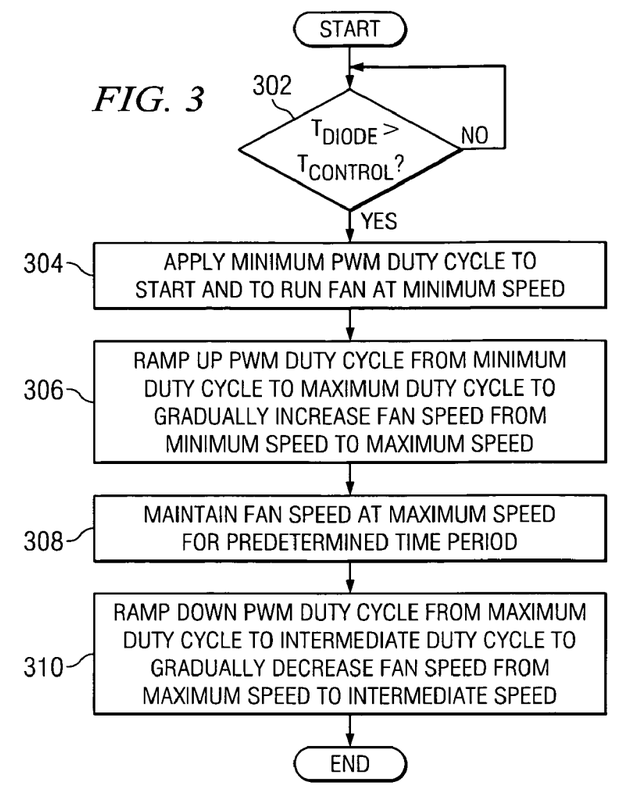
FIG. 3 is a flow diagram of the fan spin up procedure performed by the fan control system of FIG. 1.

A method of performing the presently disclosed fan spin up procedure is illustrated by reference to FIGS. 1 and 3. It should be understood that when the fan spin up procedure is performed, the motor and fan 111 are initially in the "off" condition, and the MUXs 106 and 108 are configured to connected the PWM controller 102 to the fan/motor assembly 112. As depicted in step 302, a determination is made as to whether the sensed temperature $T_{diode}$ of the computer device 114 is greater than or equal to the predetermined control level $T_{control}$. In the event $T_{diode}$ is greater than or equal to $T_{control}$, a predetermined minimum PWM duty cycle is applied, as depicted in step 304, by the PWM controller 102 to the fan/motor assembly 112 to cause the fan 111 to start and to run at its minimum speed. For example, the minimum applied PWM duty cycle may be about a 50% duty cycle. The PWM duty cycles are then ramped up, as depicted in step 306, from the minimum PWM duty cycle to a maximum PWM duty cycle to cause the fan speed to increase gradually from the minimum speed to a maximum speed. For example, the maximum applied PWM duty cycle may be about a 100% duty cycle. Next, the fan speed is maintained, as depicted in step 308, at the maximum speed for a predetermined time period. The PWM duty cycles are then ramped down, as depicted in step 310, from the maximum PWM duty cycle to a user defined intermediate PWM duty cycle to cause the fan speed to decrease gradually from the maximum speed to an intermediate speed between the minimum and maximum speeds. For example, the intermediate applied PWM duty cycle may be about a 75% duty cycle. At the end of step 310, the fan spin up procedure is completed.

After the fan spin up procedure is completed, the PWM controller 102 provides the Select1 signal to the MUX 106, in which the Select1 signal has a logical level that causes the MUX 106 to select its second input "2". As a result, an electrical connection is formed from the PWM controller 104 to the power converter 110. At this time, the PWM controller 104 is operative to perform the temperature control procedure to maintain the operating temperature of the computer device 114 at about the predetermined control level $T_{control}$. In the presently disclosed embodiment, the PWM controller 104 receives the error signal generated by the summer 124, and operates to minimize the magnitude of the error signal.

For example, the PWM controller 104 may be implemented as a proportional integral derivative (PID) controller, a fuzzy controller, a combination of a fuzzy controller and a non-fuzzy controller, or any other suitable controller. Implementing the PWM controller 104 as a PID or fuzzy controller allows the fan control system 100 to anticipate changes in the sensed temperature of the computer device 114, and to adapt the speed of the fan 111 to these sensed temperature changes.

Figure 4A:
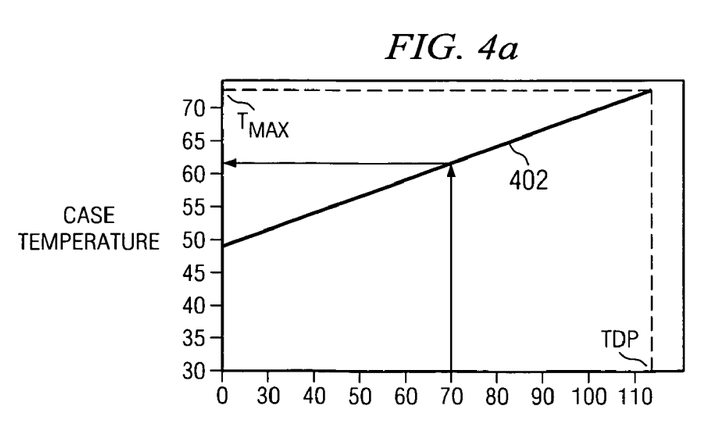
FIG. 4a is a diagram of the maximum case temperature of a representative computer device versus the device power dissipation, corresponding to the device being cooled by a fan running at its maximum speed.
Figure 4B:
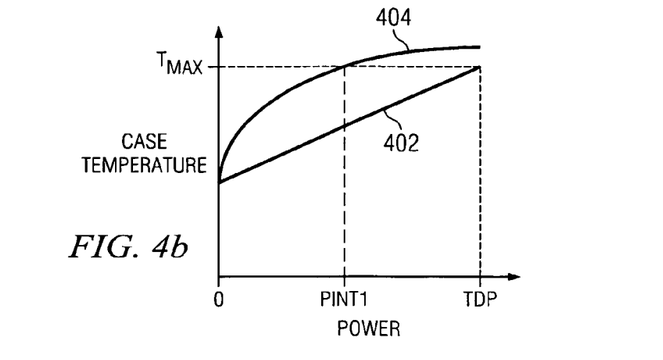
FIG. 4b is a diagram of the maximum case temperature of the representative computer device versus the device power dissipation, corresponding to the device being cooled by a fan running at a predetermined low speed.
Figure 4C:
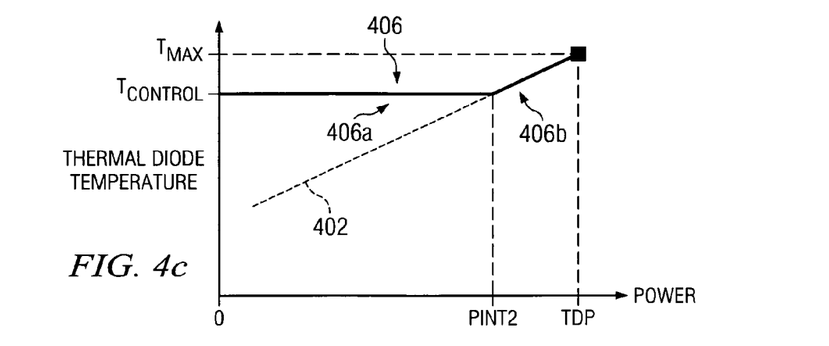
FIG. 4c is a diagram of the thermal diode temperature of the representative computer device versus the device power dissipation, corresponding to the device being cooled by a temperature control procedure performed by the fan control system of FIG. 1.

The temperature control procedure performed by the PWM controller 104 will be better understood with reference to FIGS. 4a–4c. FIG. 4a depicts a plot 402 of the maximum case temperature of the computer device 114 (see FIG. 1) versus the device power dissipation. It should be appreciated that the case temperature of the device 114 is substantially equal to the device die temperature. As shown in FIG. 4a, there is a linear relationship between the maximum case temperature of the device 114 and the device power dissipation. Specifically, as the power dissipation of the device increases (decreases), the maximum case temperature also increases (decreases). The maximum case temperature may therefore be easily determined for any power level. It is noted that the maximum case temperature ($T_{max}$) corresponding to a predetermined thermal design point (TDP) of the computer device 114 occurs at the highest temperature level of the plot 402. For example, the actual power dissipation of the computer device 114 may be measured to be about 70 watts, and the measured power may be plotted to obtain the maximum allowable case temperature of about 61° C. for that power level. To assure compliance with the plot 402 and optimal system reliability for all device operating conditions and power levels, the fan 111 would normally be run continuously at its maximum speed.

FIG. 4b depicts the plot 402 and a second plot 404 of the maximum case temperature of the computer device 114 (see FIG. 1) versus the device power dissipation. As described above, compliance with the plot 402 can be achieved by running the fan 111 continuously at its maximum speed. The plot 404 represents a situation in which the fan 111 is run at a speed significantly slower than the maximum speed (e.g., the minimum speed). As shown in FIG. 4b, there is no longer a linear relationship between the maximum case temperature of the computer device 114 and the device power dissipation when running the fan 111 at the slower speed. For example, when the fan 111 is run at the slower speed, the maximum case temperature may be reached at a first intermediate power level $P_{int1}$, which is significantly less than the thermal design point (TDP) of the device 114. However, up to this intermediate power level $P_{int1}$, the maximum case temperature remains below $T_{max}$, even though the fan 111 is not running at its maximum speed. Allowing the case temperature of the computer device 114 to rise above $T_{max}$ is not recommended because damage to the device 114 may result.

FIG. 4c depicts a plot 406 of the thermal diode temperature $T_{diode}$ of the computer device 114 (see FIG. 1) versus the device power dissipation. The plot 406 results when the fan 111 is run in accordance with the temperature control procedure performed by the PWM controller 104 (see FIG. 1). The plot 406 has two portions, i.e., a substantially flat portion 406a that remains at the predetermined control level $T_{control}$ within the power level range 0 to a second intermediate power level $P_{int2}$, and a ramp portion 406b that corresponds to the range $P_{int\ 2}$ to TDP. As shown in FIG. 4c, the predetermined control level $T_{control}$ is less than the maximum case temperature $T_{max}$.

The PWM controller 104 is operative to perform the temperature control procedure to maintain the thermal diode temperature $T_{diode}$ of the computer device 114 at about the predetermined control level $T_{control}$ within the power level range 0 to $P_{int2}$. Because $T_{control}$ is less than $T_{max}$, the fan 111 may be run at speeds that are less than its maximum speed within the range 0 to $P_{int2}$. For example, within the range 0 to $P_{int2}$, the fan 111 can be run at speeds greater than its minimum speed but less than its maximum speed, and within the range $P_{int2}$ to TDP, the fan 111 can be run at its maximum speed.

Accordingly, the presently disclosed temperature control procedure allows the speed of the fan 111 to be adjusted to make the sensed temperature of the computer device 114, as indicated by the thermal diode temperature $T_{diode}$, as close as possible to the predetermined control level $T_{control}$. In the event the sensed temperature is below $T_{control}$, the fan speed is decreased. In the event the sensed temperature is above $T_{control}$, the fan speed is increased. In this way, the temperature of the computer device 114 is prevented from significantly exceeding the predetermined control level $T_{control}$ for a substantial length of time, and the fan 111 runs only as fast as necessary to assure that the device temperature is brought below the maximum case temperature $T_{max}$ and remains as close as possible to the control level $T_{control}$. As a result, both the system power consumption and the audible fan noise are minimized. It should be noted that the fan speed is not only dependent upon the temperature and power dissipation of the computer device 114, but it may also be affected by other factors including but not limited to the ambient temperature, the supply voltage, the specific characteristics of the fan, and the elevation at which the fan control system is employed.

Figure 5:
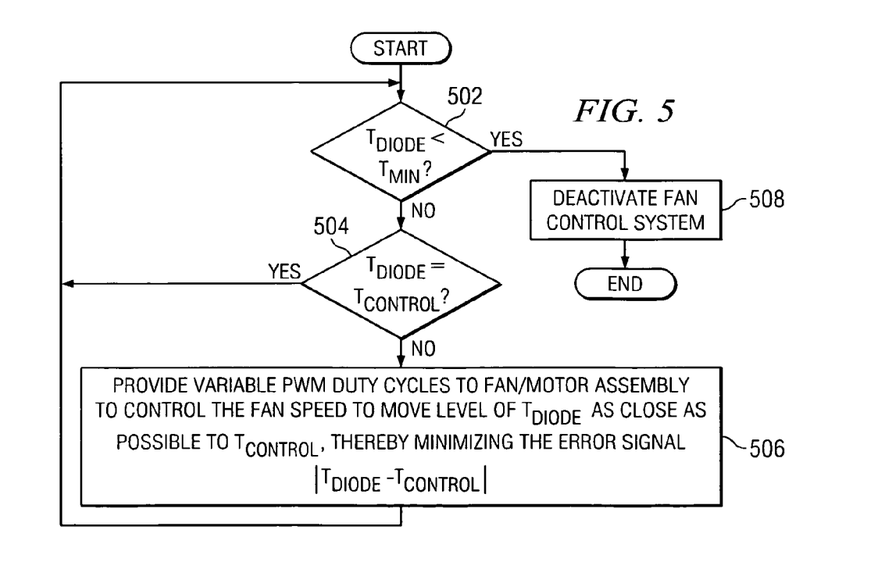
FIG. 5 is a flow diagram of the temperature control procedure performed by the fan control system of FIG. 1.

A method of performing the temperature control procedure is illustrated by reference to FIGS. 1 and 5. It should be understood that when the temperature control procedure is initially performed, the speed of the fan 111 is at about a user defined intermediate level (e.g., the intermediate level corresponding to the 75% PWM duty cycle). Further, the MUXs 106 and 108 are configured to connect the PWM controller 104 to the fan/motor assembly 112. As depicted in step 502, a first determination is made as to whether the sensed temperature $T_{diode}$ is less than the predetermined minimum level $T_{min}$. In the event $T_{diode}$ is not less than $T_{min}$, a second determination is made, as depicted in step 504, as to whether the sensed temperature $T_{diode}$ is equal to the predetermined control level $T_{control}$. In the event $T_{diode}$ is equal to $T_{control}$, the method loops back to step 502. In the event $T_{diode}$ is not equal to $T_{control}$, variable PWM duty cycles are provided, as depicted in step 506, by the PWM controller 104 to the fan/motor assembly 112 to control the fan speed in an effort to move the level of $T_{diode}$ as close as possible to the level of $T_{control}$, thereby minimizing the magnitude of the error signal $|T_{diode}-T_{control}|$ generated by the summer 124. For example, if $T_{diode}$ is less than $T_{control}$, i.e., the error magnitude is less than zero, then the PWM controller 104 provides PWM pulses having variable widths for controllably decreasing the fan speed, thereby allowing $T_{diode}$ to increase such that it gradually approaches $T_{control}$. If $T_{diode}$ is greater than $T_{control}$, i.e., the error magnitude is greater than zero, then the PWM controller 104 provides PWM pulses having variable widths for controllably increasing the fan speed, thereby causing $T_{diode}$ to decrease such that it again gradually approaches $T_{control}$. In the event $T_{diode}$ falls to a level less than $T_{min}$, fan cooling of the computer device 114 is deemed unnecessary, and the fan control system 100 is deactivated, as depicted in step 508. To that end, the control logic 118 provides the Select2 signal to the MUX 108, in which the Select2 signal has a logical level that causes the MUX 108 to select its second input "2", effectively providing a 0% PWM duty cycle to the power converter 110.

Having described the above illustrative embodiments, other alternative embodiments or variations may be made. For example, it was described that the fan control system 100 (see FIG. 1) includes the first fan controller 102 for controlling the speed and acceleration of the fan 111 during an initial spin up of the fan, and the second fan controller 104 for controlling the fan speed and acceleration to maintain the sensed temperature of the computer device 114 at about the predetermined control level after the initial fan spin up is completed. However, it should be understood that in alternative embodiments, the fan control system 100 may include one, two, or any other suitable number of fan controllers for performing the presently disclosed fan spin up and temperature control procedures.

It was also described that the fan control system includes a DC motor and fan, and that the first and second fan controllers are configured as PWM controllers for controlling the DC motor/fan. However, in alternative embodiments, the fan control system may comprise any other suitable types of motor, fan, and fan controller(s) for performing the fan spin up and temperature control procedures described herein.

It was also described that the temperature sensor 116 provides a representation of the local die temperature of the computer device 114. However, in alternative embodiments, the temperature sensor may comprise one or more temperature sensors operative to provide representations of temperatures associated with any suitable article(s) or device(s), or associated with one or more locations within a space or enclosure such as an electronics enclosure.

It will further be appreciated by those of ordinary skill in the art that modifications to and variations of the above-described advanced programmable closed loop fan control method may be made without departing from the inventive concepts disclosed herein. Accordingly, the invention should not be viewed as limited except as by the scope and spirit of the appended claims.

What is claimed is:

1. A fan control system, comprising:
    at least one temperature sensor operative to sense at least one first temperature associated with at least one first location;
    at least one fan fuzzy logic controller having at least one input; and
    at least one fan controller;
    wherein the input is operative to receive a feedback control signal representing a calculated difference between the first sensed temperature and a predetermined control temperature, and
    wherein the fan fuzzy logic controller is selectively selecting the at least one fan controller operative to generate at least one first fan control output signal for minimizing the difference between the first sensed temperature and the predetermined control temperature.

2. The system of claim 1 wherein the at least one first location is associated with at least one integrated circuit device, and the at least one temperature sensor comprises at least one thermal diode temperature sensor operative to provide a representation of a local die temperature of the integrated circuit device.

3. The system of claim 2 wherein the predetermined control temperature is less than a maximum case temperature of the integrated circuit device.

4. The system of claim 1 further including a DC motor and fan, and wherein the at least one fan controller comprises at least one pulse width modulation (PWM) controller operative to control a speed of the DC motor and fan.

5. The system of claim 4 wherein the PWM controller is operative to receive the feedback control signal as input, and to provide PWM pulses having variable duty cycles based on the feedback control signal.

6. A fan control circuit, comprising:
    at least one temperature sensor operative to sense at least one first temperature associated with at least one first location;
    at least one fan fuzzy logic controller having at least one input,
    at least one fan controller; and
    wherein the input is operative to receive a feedback control signal representing a calculated difference between the first sensed temperature and a predetermined control temperature, and
    wherein the fan fuzzy logic controller is operative selectively connected to the at least one fan controller to generate at least one first fan control output signal for minimizing the difference between the first sensed temperature and the predetermined control temperature,
    wherein the at least one fan controller is selected from the group consisting of a proportional integral derivative (PID) controller, a fuzzy controller, and a combination of a fuzzy controller and a non-fuzzy controller.

7. The system of claim 1 wherein the first fan control output signal is operative to run a cooling fan at less than maximum speed.

8. A method of controlling a cooling fan, comprising the steps of:
    sensing at least one first temperature associated with at least one first location by at least one temperature sensor;
    receiving a feedback control signal representing a calculated difference between the first sensed temperature and a predetermined control temperature by at least one fuzzy logic fan controller;
    controlling the fan with at least one fan controller; and
    selectively generating at least one first fan control output signal for minimizing the difference between the first sensed temperature and the predetermined control temperature by the fan fuzzy logic controller.

9. The method of claim 8 wherein the cooling fan is a DC fan, wherein the fan controller comprises a pulse width modulation (PWM) controller, and the receiving step includes receiving the feedback control signal as input by the PWM controller, and providing PWM pulses having variable duty cycles based on the feedback control signal by the PWM controller.

10. A method of controlling a cooling fan, comprising the steps of:
    sensing at least one first temperature associated with at least one first location by at least one temperature sensor;
    receiving a feedback control signal representing a calculated difference between the first sensed temperature and a predetermined control temperature by at least one fan fuzzy logic controller;
    selectively generating at least one first fan control output signal for minimizing the difference between the first sensed temperature and the predetermined control temperature by the fan fuzzy logic controller; and
    wherein the fan controller is selected from the group consisting of a proportional integral derivative (PID) controller, a fuzzy controller, and a combination of a fuzzy controller and a non-fuzzy controller.

11. The method of claim 8 further including the step of using the at least one first fan control output signal to run the cooling fan at less than maximum speed.

12. A method of controlling a cooling fan, the method being used to control a temperature at a first location, comprising the steps of:
    sensing a temperature associated with the first location;
    in the event the sensed temperature is less than a predetermined control temperature, at least one fan fuzzy logic controller selectively connecting at least one fan controller for providing at least one first fan control signal to run the cooling fan at one or more speeds sufficient for allowing the sensed temperature to increase gradually to substantially the predetermined control temperature; and
    in the event the sensed temperature is greater than the predetermined control temperature, the at least one fuzzy logic controller selectively connecting the at least one fan control for providing at least one second fan control signal to run the cooling fan at one or more speeds sufficient for gradually decreasing the sensed temperature to substantially the predetermined control temperature.

13. The method of claim 12 wherein the first location is associated with an integrated circuit device, and the sensed temperature is a representation of a local die temperature of the integrated circuit device.

14. The method of claim 13 wherein the predetermined control temperature is less than a maximum case temperature of the integrated circuit device.

15. The method of claim 12 further including the step of, in the event the sensed temperature is less than a predetermined minimum temperature, deactivating the cooling fan.

16. A method of performing a soft start of a cooling fan, the cooling fan being operative to run at multiple speeds, comprising the steps of:
    providing a first fan control signal to the cooling fan for running the fan at a speed corresponding to a minimum fan speed;
    selectively providing at least one second fan control signal to the cooling fan for gradually increasing the fan speed from the minimum fan speed to a maximum fan speed over a first predetermined time period;
    maintaining the fan speed at substantially the maximum fan speed over a second predetermined time period; and
    selectively providing at least one third fan control signal to the cooling fan for gradually decreasing the fan speed from the maximum fan speed to an intermediate fan speed over a third predetermined time period, the intermediate fan speed being between the minimum fan speed and the maximum fan speed.

17. The method of claim 16 wherein at least one of the first and third predetermined time periods is programmable for varying an acceleration and a deceleration, respectively, of the cooling fan.

18. The method of claim 16 wherein the intermediate fan speed is programmable.

* * * * *